(12) United States Patent
Cleary et al.

(10) Patent No.: US 9,180,803 B2
(45) Date of Patent: Nov. 10, 2015

(54) REAR PASS THROUGH POWER OUTLET

(71) Applicant: Toyota Motor Engineering & Manufacturing North America, Inc., Erlanger, KY (US)

(72) Inventors: Earnest L. Cleary, Superior Township, MI (US); Aamir U. Warsi, Howell, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 38 days.

(21) Appl. No.: 14/087,118

(22) Filed: Nov. 22, 2013

(65) Prior Publication Data

US 2015/0145272 A1    May 28, 2015

(51) Int. Cl.
*B60N 2/46* (2006.01)
*B60R 16/037* (2006.01)
*B60R 5/00* (2006.01)
B60R 5/04 (2006.01)

(52) U.S. Cl.
CPC .............. *B60N 2/4613* (2013.01); *B60R 5/006* (2013.01); *B60R 16/037* (2013.01); B60R 5/04 (2013.01)

(58) Field of Classification Search
CPC ............ B60N 2/02; B60N 2/20; B60N 2/206; B60N 2/3004; B60N 2/3009; B60N 2/3011; B60N 2/3081; B60N 2/3084; B60N 2/36; B60N 2/46; B60N 2/4606; B60N 2/4613; B60R 5/006
USPC ............. 296/37.8, 37.15, 37.16, 66; 297/113, 297/359, 411.3, 411.32
See application file for complete search history.

(56) References Cited

U.S. PATENT DOCUMENTS

| | | | |
|---|---|---|---|
| 5,628,543 A | 5/1997 | Filipovich et al. | |
| 6,217,112 B1* | 4/2001 | Linsenmeier et al. | 297/113 |
| 6,379,178 B1* | 4/2002 | Jones et al. | 439/501 |
| 6,508,508 B1 | 1/2003 | Bargiel | |
| 6,641,212 B2* | 11/2003 | Sitzler | 297/217.3 |
| 7,152,899 B2 | 12/2006 | Hazlewood et al. | |
| 7,413,229 B2 | 8/2008 | Kukucka et al. | |
| 8,104,816 B2* | 1/2012 | Lupton et al. | 296/37.1 |
| 2010/0078954 A1 | 4/2010 | Liu et al. | |
| 2010/0156128 A1* | 6/2010 | Dexter et al. | 296/24.34 |
| 2010/0244502 A1 | 9/2010 | Andersson et al. | |
| 2013/0038279 A1 | 2/2013 | Seyerle et al. | |
| 2013/0106346 A1 | 5/2013 | Salter et al. | |

FOREIGN PATENT DOCUMENTS

GB    2446588 A    8/2008

* cited by examiner

Primary Examiner — Jason S Daniels
(74) Attorney, Agent, or Firm — Dinsmore & Shohl LLP (57) ABSTRACT

A rear seat assembly within an automotive vehicle is provided. The seat assembly including a seat bottom portion and a seat back portion where the seat back portion includes a fold down arm rest movable from a closed position to an open position. The fold down arm rest is pivotable about a first pivot point. A generally vertical wall separates a cab portion of the vehicle from a trunk portion of the vehicle. The wall is connected to the seat back portion and is generally parallel with the seat back portion. A passageway or pass through portion connects the cab portion of the vehicle with the trunk portion of the vehicle. A power supply portion is mounted to the generally vertical wall and is mounted adjacent to or within the passageway. The power supply portion is accessible when the fold down arm rest is in the open position.

10 Claims, 7 Drawing Sheets

REAR PASS THROUGH POWER OUTLET

FIELD OF THE INVENTION

The present invention relates generally to power outlets within vehicles. More particularly, this invention relates to power outlet positioned adjacent to the rear passageway from the cab to the trunk compartment of a vehicle.

BACKGROUND OF THE INVENTION

It is well known in the art to provide charging ports, such as cigarette lighters, on the front dashboard or front center console of a vehicle. With the frequent use of portable electronic devices, such as cell phones, these charging ports are more commonly used now than ever for charging portable electronic devices while in the automotive vehicle. These charging outlets have proved to be extremely beneficial to those in the driver seat and passenger seat while the users are in the vehicle. However, as electronic devices become more popular, the need for charging outlets in other areas of the vehicle becomes necessary. As such, there exists a need in the art to provide a power outlet in the rear seat of an automotive vehicle for users riding in the rear seat.

SUMMARY OF THE INVENTION

The present invention provides for a rear seat assembly within an automotive vehicle. The seat assembly includes a seat bottom portion and a seat back portion where the seat back portion includes a fold down arm rest movable from a closed position to an open position. The fold down arm rest is pivotable about a first pivot point. A generally vertical wall separates a cab portion of the vehicle from a trunk portion of the vehicle. The wall is connected to the seat back portion and is generally parallel with the seat back portion. A passageway or pass through portion connects the cab portion of the vehicle with the trunk portion of the vehicle. A power supply portion is mounted to the generally vertical wall and is mounted adjacent to or within the passageway. The power supply portion is accessible when the fold down arm rest is in the open position.

DETAILED DESCRIPTION OF THE INVENTION

The present invention provides for a seat assembly having a power outlet positioned adjacent to a passageway connecting a cab portion of a vehicle to the trunk portion of a vehicle. The passageway allows users within the cab portion of the vehicle to access items located within the trunk. Both the passageway and the power outlet are covered when a fold down arm rest is in a closed position. Positioning of the power outlet in a rear seat of a vehicle allows users of the back seat of the vehicle to access the power supply without having to use the front seat power supply. Positioning of the power supply on a back wall of the seat assembly removes the power outlet from the fold down arm rest assembly allowing the arm rest assembly to include other components such as storage areas and cup holders. Further, positioning of the power outlet on the back generally vertical wall spaces the power outlet away from potentially hazardous materials such as fluids from a cup in the cup holder, food, or other debris. Further, positioning the power outlet on the back generally vertical wall of the seat assembly allows the fold down arm rest assembly to fully cover the power outlet when the fold down arm rest assembly is in a closed position. This adds a security feature to the power outlets by allowing the fold down arm rest to fully cover and potentially lock so as a user, such as a child, cannot access the power outlets.

Figure 1:
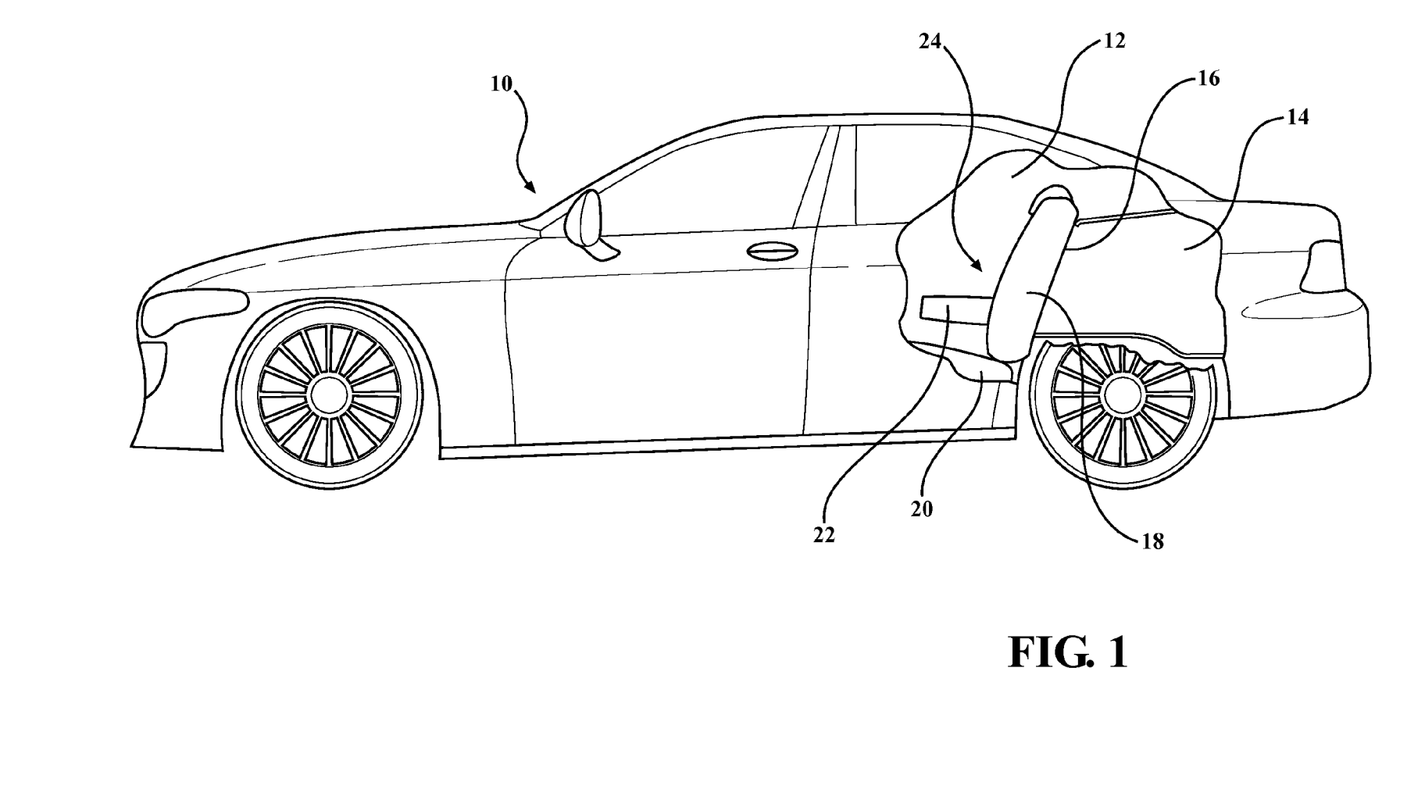
FIG. 1 illustrates a side cutout view of the vehicle and seat assembly of the present invention.

FIG. 1 illustrates a side view having a cutout portion of the vehicle 10. The vehicle 10 includes an interior cab portion 12 and a trunk portion 14. A rear generally vertical wall 16 is disposed between the inner cab portion 12 and the trunk portion 14. A seat assembly 24 is provided having a seat back portion 18 and a seat bottom portion 20. A fold down arm rest 22 is further provided connected to the seat back portion 18.

Figure 2:
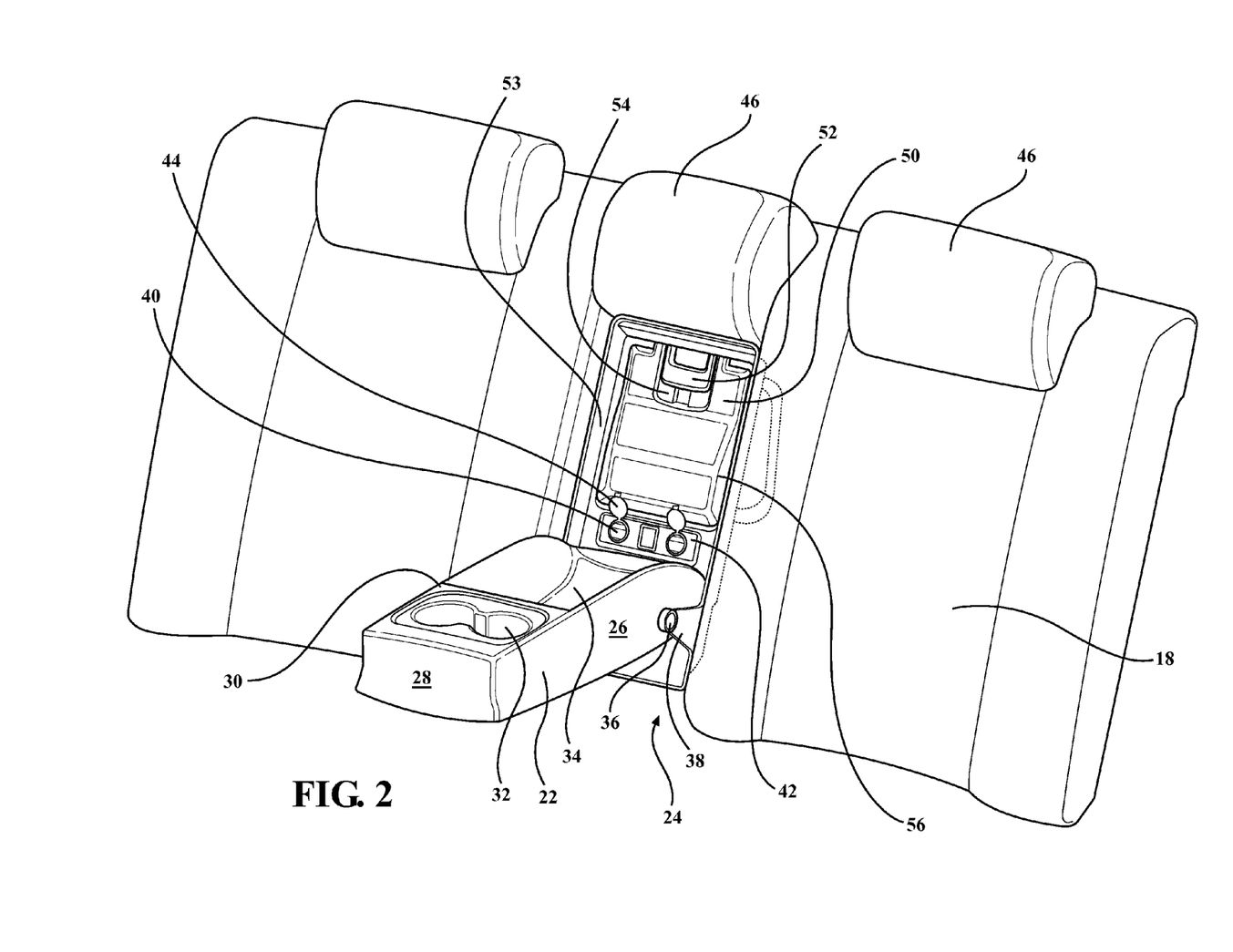
FIG. 2 illustrates a perspective view of the seat assembly with the fold down arm rest in the open position.

FIG. 2 illustrates a perspective view of the rear seat assembly 24. The rear seat assembly 24 includes the fold down arm rest portion 22 having side surfaces 26 and a front surface 28. The fold down arm rest 22 includes an upper surface 30 having cup holders 32 and a storage compartment 34. In the present embodiment, the fold down arm rest is generally rectangular having a rear tapered portion and generally vertical side surfaces 26, 28. The arm rest 22 is covered in either a cloth, leather, vinyl, or similar material corresponding to the interior color scheme of the vehicle.

Figure 3A:
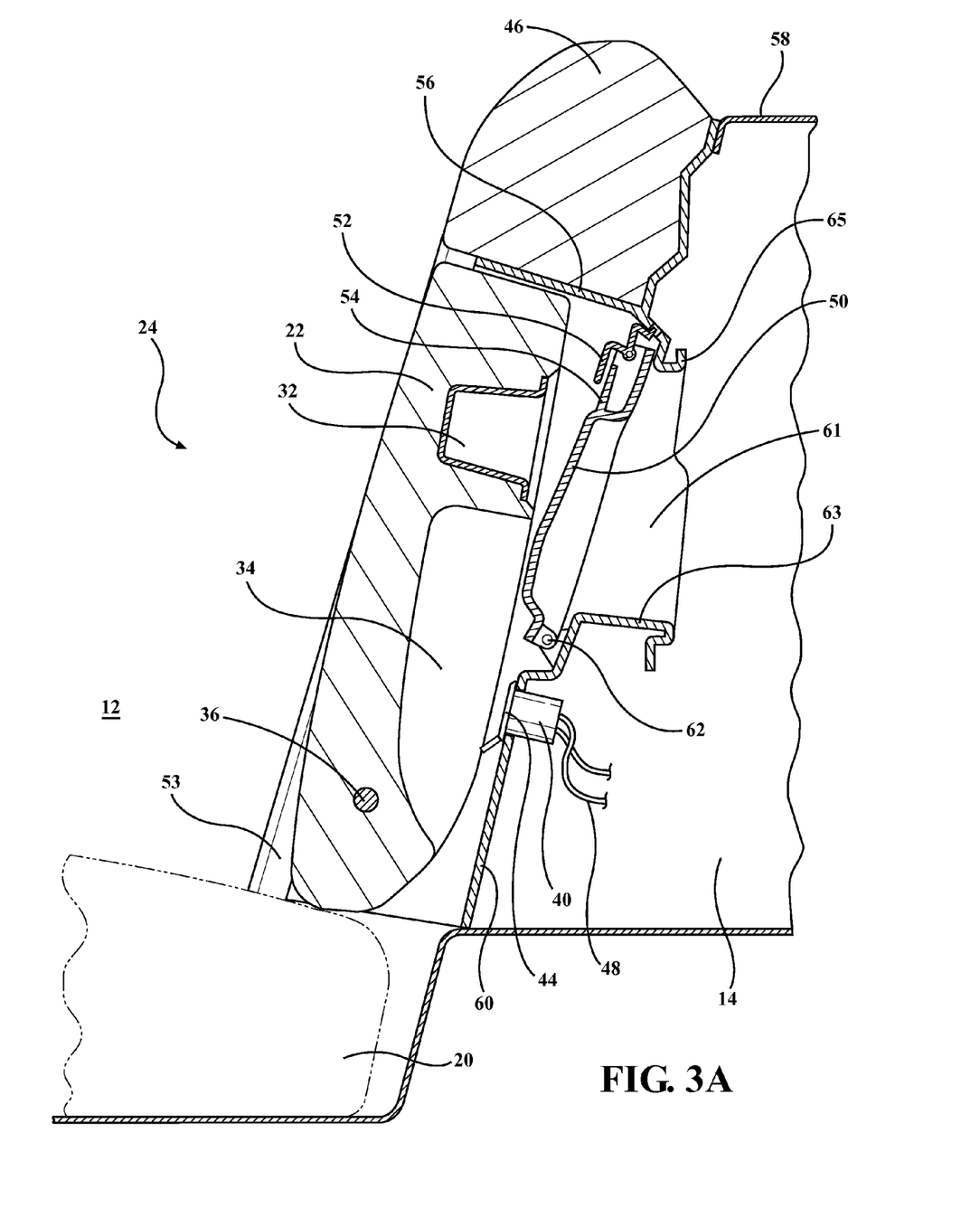
FIG. 3A illustrates a cross-sectional view of the seat assembly of the present invention where the power supply is positioned on the generally vertical wall of the seat assembly.
Figure 3B:
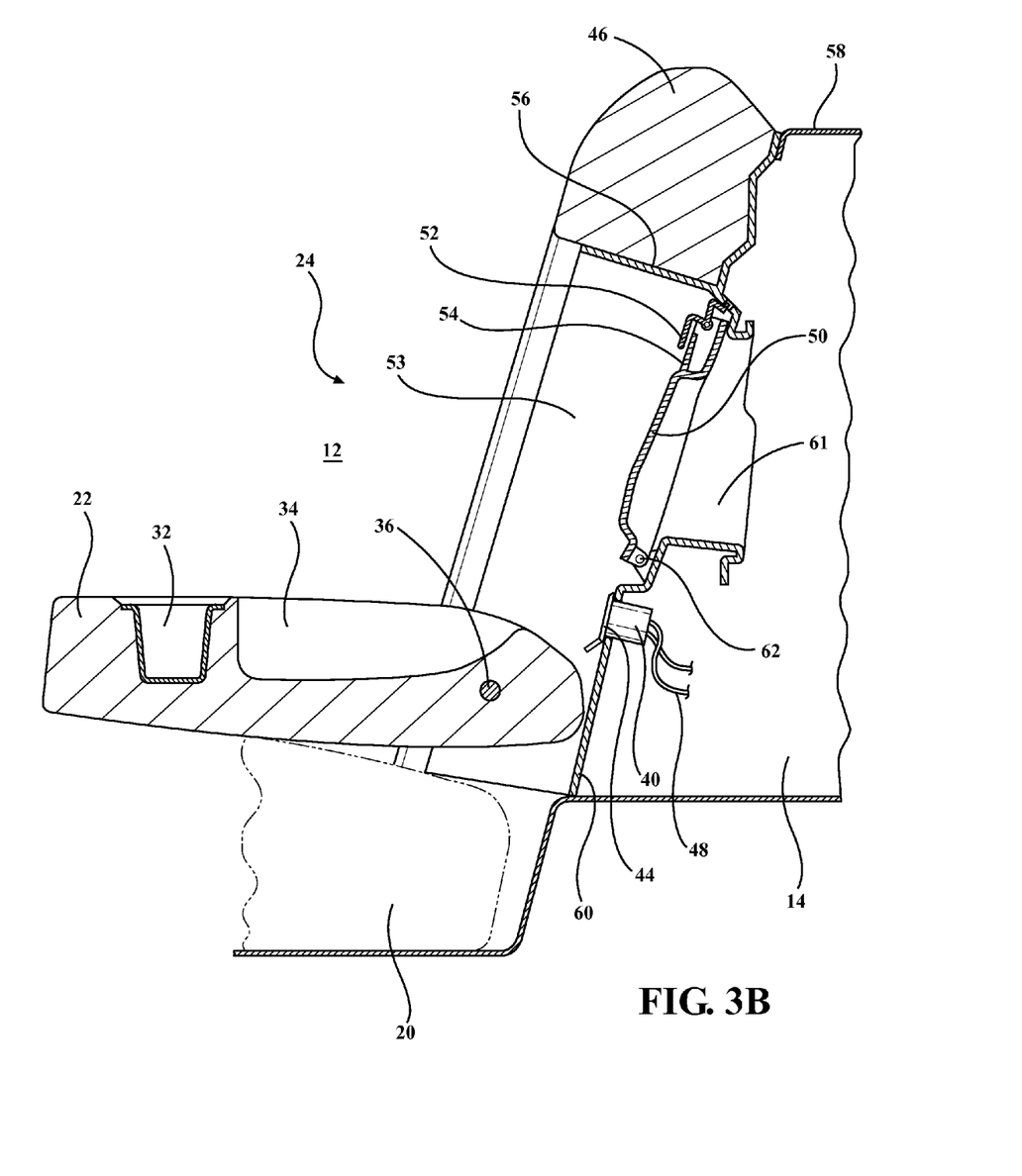
FIG. 3B illustrates the seat assembly of the present invention where the fold down arm rest is in an open position.

The fold down arm rest portion 22 is movable from an open position to a closed position, or vice versa, and is pivotable about a pivot point 36. The pivot point 36 may include a bolt or other elongated member extending through the fold down arm rest 22. In the present embodiment, the fold down arm rest 22 connects to a bracket 38 by means of the pivot point 36. The bracket 38 is further connected to a housing portion 53 located and connected to the seat back portion 18 and the rear wall 60 (as shown in FIGS. 3A and 3B). The closed position of the fold down arm rest 22 is illustrated in FIG. 3A. When the arm rest 22 is in the closed position, the arm rest 22 rests within the housing 53. The closed position allows for a passenger to sit in a middle seat and fully covers the power outlets.

FIG. 3B illustrates the fold down arm rest in an open position allowing the user to easily access the power outlets. When the fold down arm rest 22 is in the open position, the fold down arm rest is generally parallel with the seat bottom portion 20. Further, when the fold down arm rest 22 is in the open position, the fold down arm rest 22 is in a generally horizontal position.

The seat assembly 24 includes the seat back portion 18. The seat back portion 18 further includes headrests 46 and is typically covered with a cloth, vinyl, leather, or other similar material corresponding to the colors within the vehicle.

The seat assembly 24 further includes a rear wall 60. The rear wall 60 is connected to the seat back portion 18. The rear wall 60 may further be a rear surface of the seat back portion 18. Further, the rear wall 60 may be interconnected with or considered a one piece assembly with the back portion 18.

The rear wall 60 is generally vertical, or slightly angled, and extends along the entire back portion 18. The wall 60 includes a passageway 61 connecting the cab portion 12 with trunk portion 14. The passageway 61 is generally rectangular or square and may include supplemental bracket portions 63, 65 for providing further support. The passageway 61, in the present embodiment, includes a cover 50 operable to cover and lock the passageway 61. The cover 50 includes a handle portion 52, 54. The user is able to pull on the handle 54 to release the lock and lower the cover 50 into a generally horizontal position allowing the user to access the trunk portion 14. The cover portion 50 is operable to rotate about a pivot point 62 connected to the rear wall 60. The cover 50 further includes an outer (or lower surface when in an open position) surface 56.

A charging outlet 40 is provided on the rear wall 60 and adjacent to the passageway 61. In the present embodiment as shown in FIGS. 3A and 3B, the charging outlet 40 is positioned below the passageway 61 and is fully covered by the fold down arm rest 22 when the fold down arm rest 22 is in the closed position as shown in FIG. 3A. The charging outlet 40 further includes a plurality of wires or cables 48 extending into the trunk portion 14. The charging outlet 40 further includes a cap 44. The cables 48, in the present embodiment, include USB charging or data transfer connectors. Other embodiments of the cables 48 may include mini-USB connectors, pin connects or any other suitable connector for data transfer and/or power transfer. Positioning of the charging outlet 40 on the rear wall 60 as shown in FIGS. 3A and 3B allows various charging cables 48 to extend into the trunk portion, or other storage area, for easy hiding and installation. Positioning of the charging outlet 40 on the rear wall 60 is desirable as opposed to positioning the charging outlet 40 within the arm rest portion 22 as it does not require the wires 48 to be extended through and positioned around a pivot point. In the present embodiment such as shown in FIGS. 3A and 3B, the wires 48 are easily hidden and allowed to extend easily into the trunk portion 14. The charging outlet 40 may further be positioned within a housing or mounting plate 42 positioned on the rear wall 60.

Figure 4A:
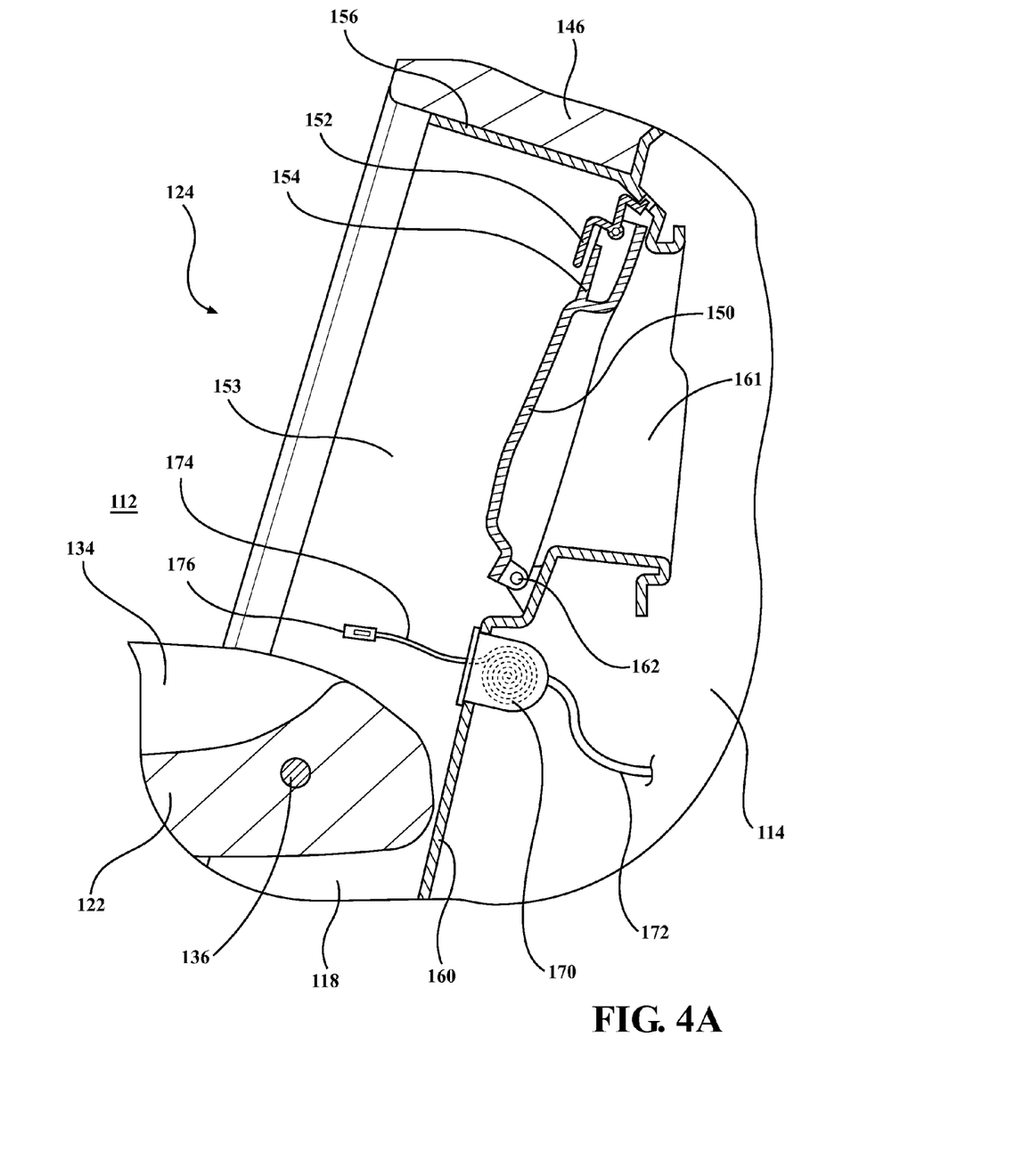
FIG. 4A illustrates an alternative embodiment of the present invention having a retractable cord.

FIG. 4A illustrates an alternative embodiment of the present invention having a retractable cord assembly 170. The rear seat assembly 124 includes the fold down arm rest portion 122. The fold down arm rest 122 includes cup holders and a storage compartment 134. The fold down arm rest 122 is generally rectangular having a rear tapered portion and generally vertical side surfaces. The arm rest 122 is covered in either cloth, leather, vinyl, or similar material corresponding to the interior color scheme of the vehicle.

The fold down arm rest portion 122 is movable from an open position to a closed position, or vice versa, and is pivotable about a pivot point 136. The pivot point 136 may include a bolt or other elongated member extending through the fold down arm rest 122. In the present embodiment, the fold down arm rest 122 connects to a bracket by means of the pivot point 136. The bracket is further connected to a housing portion 153 located and connected to the seat back portion 118 and the rear wall 160. FIG. 4A illustrates the arm rest 122 in the open position. When the arm rest 122 is in the closed position, the arm rest 122 rests within the housing 153. The closed position allows for a passenger to sit in a middle seat and fully covers the power outlets.

The rear seat assembly 124 includes a seat back portion 118. The seat back portion 118 further includes headrests 146 and is typically covered with a cloth, vinyl, leather, or other similar material corresponding to the colors within the vehicle.

The seat assembly 124 further includes a rear wall 160. The rear wall 160 is connected to the seat back portion 118. The rear wall 160 may further be a rear surface of the seat back portion 118. Further, the rear wall 160 may be interconnected with or considered a one piece assembly with the back portion 118.

The rear wall 160 is generally vertical, or slightly angled, and extends along the entire back portion 118. The wall 160 includes a passageway 161 connecting the cab portion 112 with trunk portion 114. The passageway 161 is generally rectangular or square and may include supplemental bracket portions for providing further support. The passageway 161, in the present embodiment, includes a cover 150 operable to cover and lock the passageway 161. The cover 150 includes a handle portion 152, 154. The user is able to pull on the handle 154 to release the lock and lower the cover 150 into a generally horizontal position allowing the user to access the trunk portion 114. The cover portion 150 is operable to rotate about a pivot point 162 connected to the rear wall 160.

The alternative embodiments as shown in FIG. 4A includes a retractable cord assembly 170. The retractable cord is positioned on the rear wall 160. A first cord 172 extends into the trunk portion 114 of the assembly 124. A retractable cord 174 includes a connection portion 176 to connect to a portable electronic device (not shown).

Figure 4B:
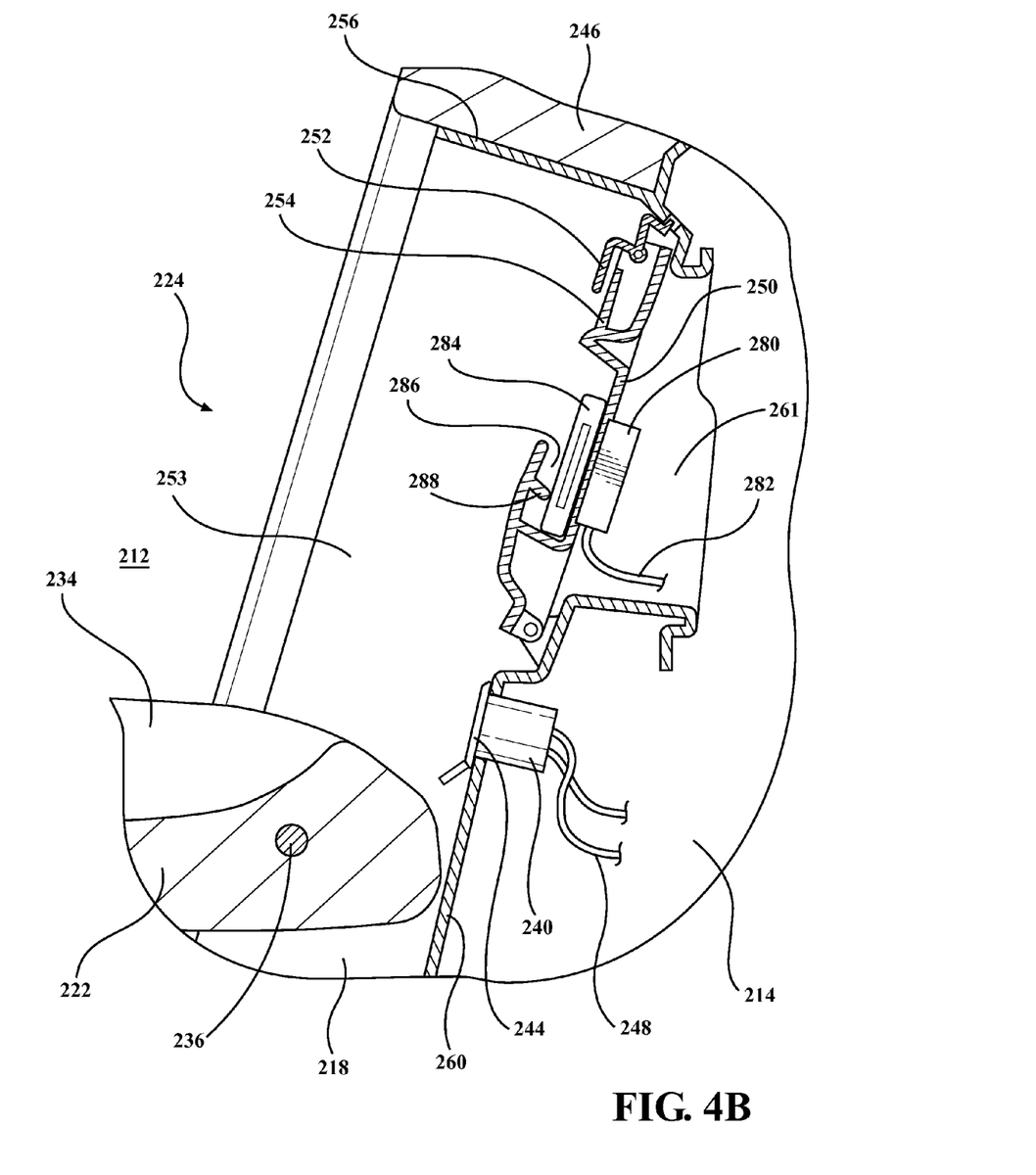
FIG. 4B illustrates yet another alternative embodiment where a wireless charger is provided.
Figure 4C:
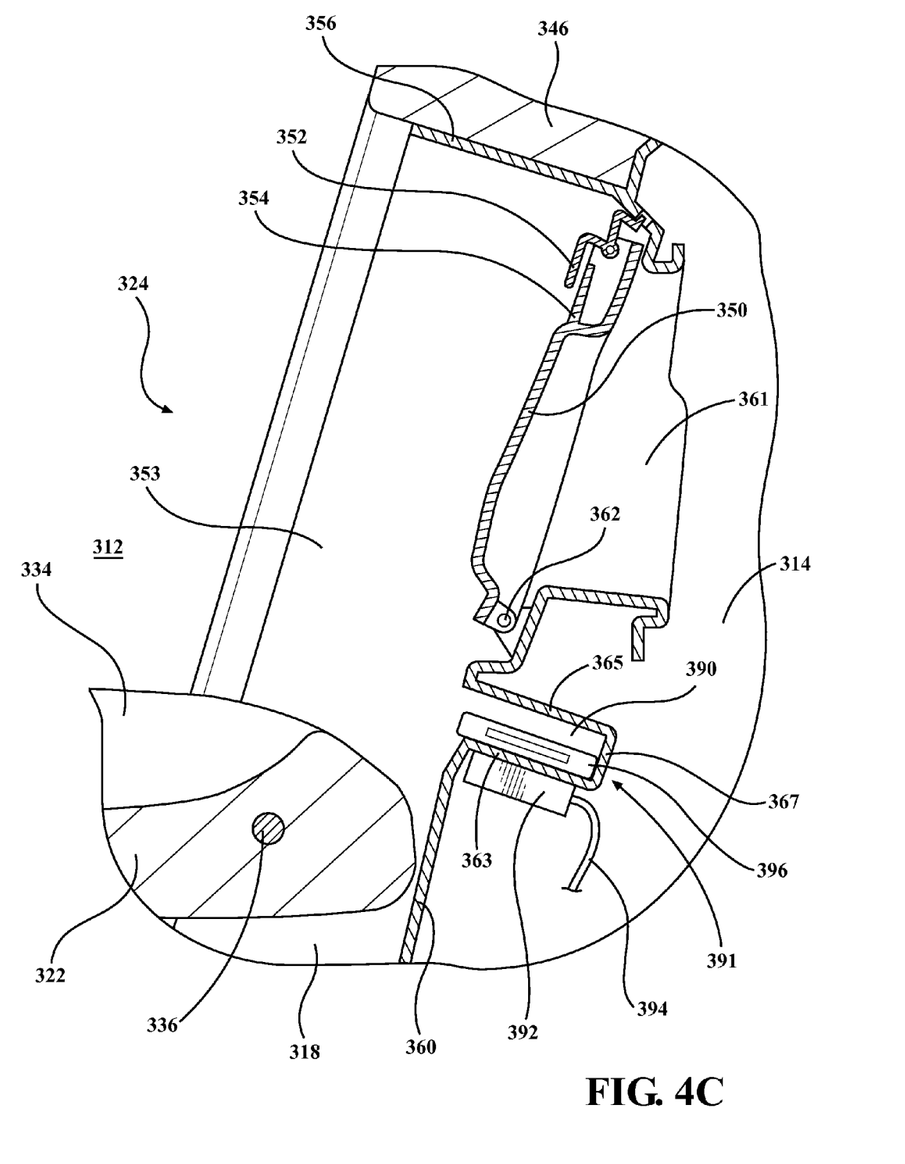
FIG. 4C illustrates an alternative embodiment of a wireless charging system.

FIGS. 4B and 4C illustrate an alternative embodiment of the present invention having wireless charging capability. Referring now to FIG. 4B. The rear seat assembly 224 includes the fold down arm rest portion 222. The fold down arm rest 222 includes cup holders and a storage compartment 234. The fold down arm rest 222 is generally rectangular having a rear tapered portion and generally vertical side surfaces. The arm rest 222 is covered in either cloth, leather, vinyl, or similar material corresponding to the interior color scheme of the vehicle.

The fold down arm rest portion 222 is movable from an open position to a closed position, or vice versa, and is pivotable about a pivot point 236. The pivot point 236 may include a bolt or other elongated member extending through the fold down arm rest 222. In the present embodiment, the fold down arm rest 222 connects to a bracket by means of the pivot point 236. The bracket is further connected to a housing portion 253 located and connected to the seat back portion and the rear wall 260. FIG. 4B illustrates the arm rest 222 in the open position. When the arm rest 222 is in the closed position, the arm rest 222 rests within the housing 253. The closed position allows for a passenger to sit in a middle seat and fully covers the power outlets.

The seat assembly 224 includes a seat back portion 218. The seat back portion 218 further includes headrests 246 and is typically covered with a cloth, vinyl, leather, or other similar material corresponding to the colors within the vehicle.

The seat assembly 224 further includes a rear wall 260. The rear wall 260 is connected to the seat back portion 218. The rear wall 260 may further be a rear surface of the seat back portion 218. Further, the rear wall 260 may be interconnected with or considered a one piece assembly with the back portion 218.

The rear wall 260 is generally vertical, or slightly angled, and extends along the entire back portion 218. The wall 260 includes a passageway 261 connecting the cab portion 212 with trunk portion 214. The passageway 261 is generally rectangular or square and may include supplemental bracket portions for providing further support. The passageway 261, in the present embodiment, includes a cover 250 operable to cover and lock the passageway 261. The cover 250 includes a handle portion 252, 254. The user is able to pull on the handle 254 to release the lock and lower the cover 250 into a generally horizontal position allowing the user to access the trunk portion 214. The cover portion 250 is operable to rotate about a pivot point connected to the rear wall 260.

FIG. 4B illustrates a charging outlet 240 is provided on the rear wall 260 and adjacent to the passageway 261. In this alternative embodiment, the charging outlet 240 is positioned below the passageway 261 and is fully covered by the fold down arm rest 222 when the fold down arm rest 222 is in the closed position. The charging outlet 240 further includes a plurality of cables 248 extending into the trunk portion 214. The charging outlet 240 further includes a cap 244. Positioning of the charging outlet 240 on the rear wall 260 allows various charging cables 248 to extend into the trunk portion, or other storage area, for easy hiding and installation. Positioning of the charging outlet 240 on the rear wall 260 is desirable as opposed to positioning the charging outlet 240 within the arm rest portion 222 as it does not require the wires 248 to be extended through and positioned around a pivot point. The wires 248 are easily hidden and allowed to extend easily into the trunk portion 214.

FIG. 4B further illustrates a wireless charging assembly 280 provided connected to the cover 250 of the passageway 261. The wireless charging assembly 280 connects to a rear wall of the cover 250. A holding area 286 is provided to accept and secure a portable electronic device 284, such as a cell phone. Cord 282 extends into the trunk portion 214. A securing tab portion 288 is further provided to secure the portable electronic device 284.

Referring now to FIG. 4C. The rear seat assembly 324 includes the fold down arm rest portion 322. The fold down arm rest 322 includes cup holders and a storage compartment 334. The fold down arm rest 322 is generally rectangular having a rear tapered portion and generally vertical side surfaces. The arm rest 322 is covered in either cloth, leather, vinyl, or similar material corresponding to the interior color scheme of the vehicle.

The fold down arm rest portion 322 is movable from an open position to a closed position, or vice versa, and is pivotable about a pivot point 336. The pivot point 336 may include a bolt or other elongated member extending through the fold down arm rest 322. In the present embodiment, the fold down arm rest 322 connects to a bracket by means of the pivot point 336. The bracket is further connected to a housing portion 353 located and connected to the seat back portion and the rear wall 360. FIG. 4C illustrates the arm rest 322 in the open position. When the arm rest 322 is in the closed position, the arm rest 322 rests within the housing 353. The closed position allows for a passenger to sit in a middle seat and fully covers the power outlets.

The seat assembly 324 includes a seat back portion 318. The seat back portion 318 further includes headrests 346 and is typically covered with a cloth, vinyl, leather, or other similar material corresponding to the colors within the vehicle.

The seat assembly 324 further includes a rear wall 360. The rear wall 360 is connected to the seat back portion 318. The rear wall 360 may further be a rear surface of the seat back portion 318. Further, the rear wall 360 may be interconnected with or considered a one piece assembly with the back portion 318.

The rear wall 360 is generally vertical, or slightly angled, and extends along the entire back portion 318. The wall 360 includes a passageway 361 connecting the cab portion 312 with trunk portion 314. The passageway 361 is generally rectangular or square and may include supplemental bracket portions for providing further support. The passageway 361, in the present embodiment, includes a cover 350 operable to cover and lock the passageway 361. The cover 350 includes a handle portion 352, 354. Upper housing portion 356 is also provided. The user is able to pull on the handle 354 to release the lock and lower the cover 350 into a generally horizontal position allowing the user to access the trunk portion 314. The cover portion 350 is operable to rotate about a pivot point 362 connected to the rear wall 360.

A wireless charging assembly 391 is provided mounted on the rear wall 360. The wireless charging assembly 391 includes an interior portion 390 designed to accept a portable electronic device 396. A wireless charging unit 392 is provided mounted to an extended portion of the rear wall 360. The rear wall 360 is designed to include a compartment portion having an upper wall 363, a lower wall 365 and a rear wall 367. Side walls are also provided (now shown in this cross-sectional view) to form a box-like compartment. Power is transferred from the wireless charging unit 392 to the portable electronic device 396 according to known wireless charging methods. The wireless charging devices of both FIGS. 4B and 4C may further includes a wireless charging pad. A cable 394 further connects the wireless charging unit 392 to the trunk area 314.

The invention is not restricted to the illustrative examples and embodiments described above. The embodiments are not intended as limitations on the scope of the invention. Methods, apparatus, compositions, and the like described herein are exemplary and not intended as limitations on the scope of the invention. Changes therein and other uses will occur to those skilled in the art. The scope of the invention is defined by the scope of the claims.

The invention claimed is:

1. A rear seat assembly within an automotive vehicle, the rear seat assembly comprising:
a seat bottom portion and a seat back portion, the seat back portion having a fold down arm rest movable from a closed position to an open position, the fold down arm rest pivotable about a first pivot point;
a wall separating a cab portion from a trunk portion, the wall fixedly connected to the seat back portion, the wall generally parallel with the seat back portion, a passageway on the wall connecting the cab portion of the vehicle to the trunk portion of the vehicle, the passageway covered by a door pivotable from a first closed position to a second closed position, the wall at least partially covered by the arm rest when the door is in the closed position, the wall at least partially spaced apart from the arm rest when the arm rest is in the closed position; and
a power supply mounted to the wall, the power supply portion mounted adjacent to the passageway, the power supply portion accessible when the fold down arm rest is in the open position, wherein the wall is positioned directly below the passageway, the power supply mounted directly below the passageway.

2. The rear seat assembly of claim 1 wherein the power supply portion is a wireless charging pad.

3. The rear seat assembly of claim 2 wherein the wireless charging pad is mounted within a depression on the wall.

4. The rear seat assembly of claim 1 wherein the power supply portion is a cigarette lighter port.

5. The rear seat assembly of claim 1 wherein the power supply portion includes a cord for charging or transferring information.

6. The rear seat assembly of claim 5 wherein the cord is retractable.

7. The rear seat assembly of claim 5 wherein the cord includes at least one USB connector.

8. The rear seat assembly of claim 1 wherein a door is pivotally mounted to the wall operable to cover the passageway connecting the cab portion of the vehicle to the trunk portion of the vehicle.

9. A rear seat assembly within an automotive vehicle, the rear seat assembly comprising:
- a seat bottom portion and a seat back portion, the seat back portion having a fold down arm rest movable from a closed position to an open position, the fold down arm rest pivotable about a first pivot point;
- a wall separating a cab portion from a trunk portion, the wall connected to the seat back portion, the wall generally parallel with the seat back portion, a passageway connecting the cab portion of the vehicle to the trunk portion of the vehicle; and
- a door covering the passageway, a power supply portion mounted to the door, the power supply portion accessible when the fold down arm rest is in the open position
- the power supply portion is a wireless charging pad, the wireless charging pad is mounted within a compartment on the door.

10. A rear seat assembly within an automotive vehicle, the rear seat assembly comprising:
- a seat bottom portion and a seat back portion, the seat back portion having a fold down arm rest movable from a closed position to an open position, the fold down arm rest pivotable about a first pivot point;
- a wall separating a cab portion from a trunk portion, the wall connected to the seat back portion, the wall generally parallel with the seat back portion, a passageway on the wall connecting the cab portion of the vehicle to the trunk portion of the vehicle, the passageway covered by a door pivotable from a first closed position to a second closed position; and
- a power supply mounted to the wall, the power supply portion mounted adjacent to the passageway, a portion of the power supply extending into the trunk portion, the power supply portion accessible when the fold down arm rest is in the open position, the power supply extending between the cab portion and the trunk portion thereby allowing at least one cord of the power supply portion to extend into the trunk portion and thereby out of the way of the user of the automotive vehicle.

* * * * *